UNITED STATES PATENT OFFICE.

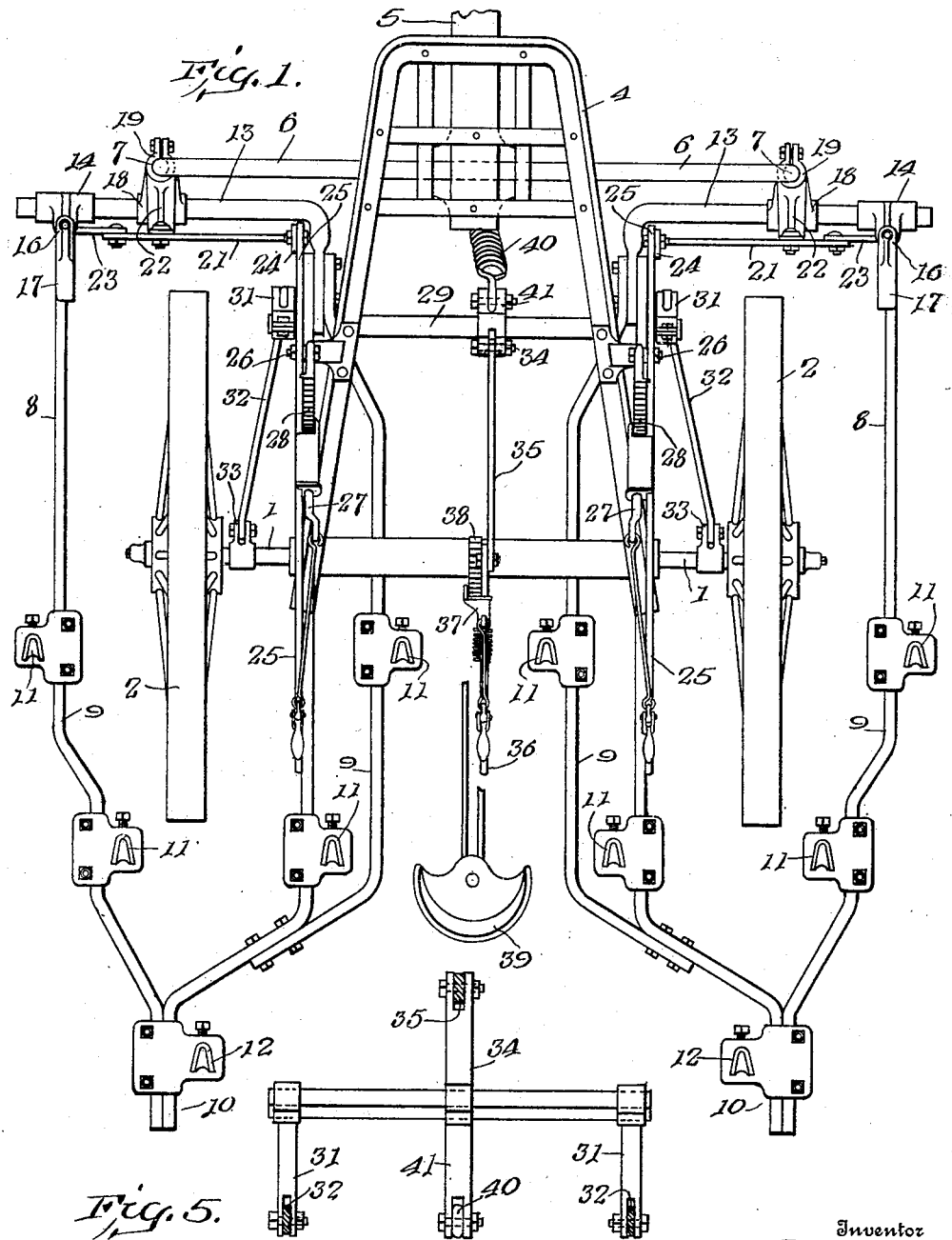

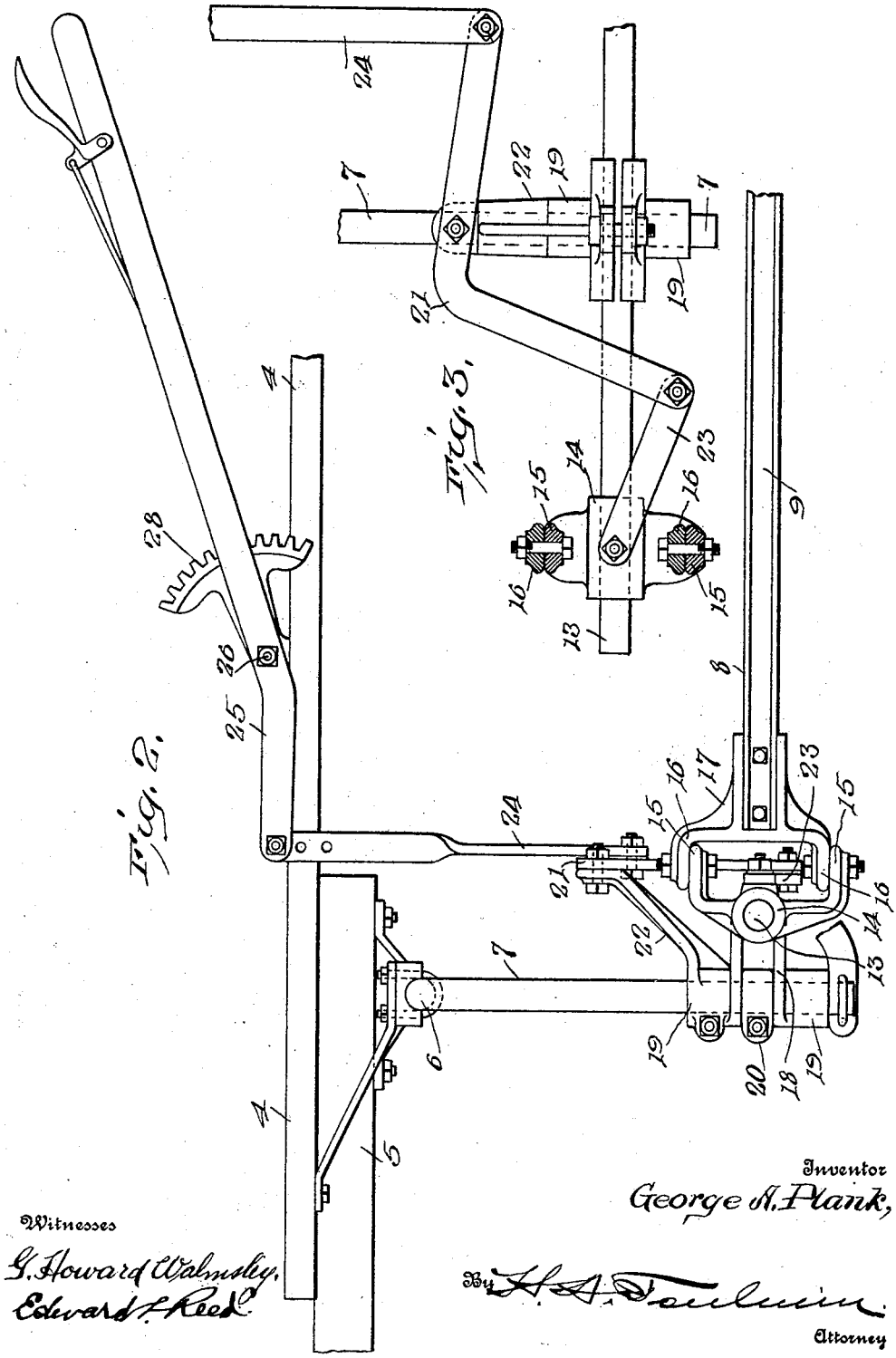

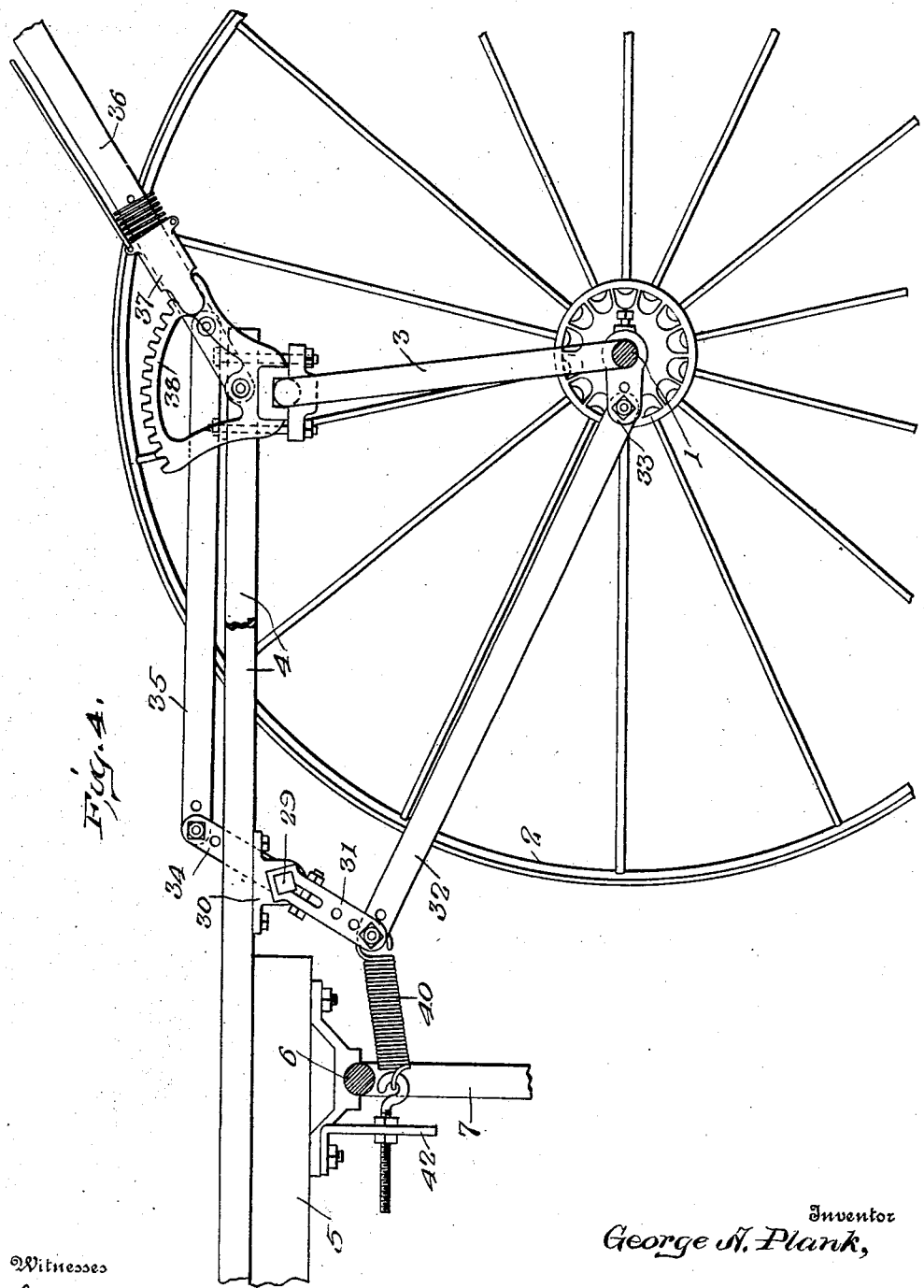

GEORGE A. PLANK, OF INDEPENDENCE, MISSOURI, ASSIGNOR TO THE OHIO CULTIVATOR COMPANY, OF BELLEVUE, OHIO, A CORPORATION OF OHIO.

CULTIVATOR.

No. 903,882.　　　　Specification of Letters Patent.　　　　Patented Nov. 17, 1908.

Application filed April 29, 1908. Serial No. 429,885.

*To all whom it may concern:*

Be it known that I, GEORGE A. PLANK, a citizen of the United States, residing at Independence, in the county of Jackson and State of Missouri, have invented certain new and useful Improvements in Cultivators, of which the following is a specification, reference being had therein to the accompanying drawings.

This invention relates to cultivators, and is in the nature of an improvement upon Patent No. 872,453, granted to me December 3, 1907.

The object of the invention is to provide a cultivator of this character with means whereby the cultivating members may be adjusted relatively one to the other by the operator from his position in the rear of the machine and without interrupting the progress of the machine; and further, to provide such a machine with means for facilitating the movement of the main frame relatively to the axle to raise and lower the beams carrying the cultivating members.

With these objects in view, my invention consists in certain novel features of construction and in certain parts and combinations hereinafter to be described, and then more particularly pointed out in the claims.

In the accompanying drawings, Figure 1 is a top plan view of a cultivator embodying my invention, with the parts thereof not relating to the present invention eliminated; Fig. 2 is an end elevation of the adjusting mechanism for the cultivating members; Fig. 3 is a side elevation of the same looking toward the front of the machine; Fig. 4 is a side elevation of a portion of the machine, with one of the ground wheels removed to show the mechanism for controlling the movement of the main frame relatively to the axles; and Fig. 5 is a detail view showing the position of the several connecting arms on the transverse shaft.

In these drawings I have illustrated only so much of the cultivator as directly relates to the present invention, the remaining features of construction being the same as those shown and described in the above-mentioned patent. As here shown, the machine comprises an axle 1 having ground wheels 2 mounted thereon and provided with an upwardly extending central portion 3 upon the horizontal upper portion of which is pivotally supported a main frame 4, to the forward end of which is secured the tongue 5. Supported from the forward portion of the main frame is a yoke or supporting member 6 having vertically arranged side members 7, to which are connected the forward ends of the shovel beams 8. Each of these beams preferably comprises two substantially parallel members 9 extending on opposite sides of the adjacent ground wheel. These members are preferably rigidly secured one to the other at the rear ends thereof, as shown at 10, and are provided with a plurality of shovels 11, supported therefrom on the opposite sides of the ground wheel, and are preferably provided with a single shovel 12 secured thereto at the point of connection of the rear ends thereof and substantially midway between the paths of the shovels on opposite sides of said wheel. The forward end of one of the side members 9 of the beam 8, in the present instance the inner member, has rigidly secured and extending at substantially right angles thereto in a direction toward the other member a transverse bar 13, to which the forward end of the other member 9 of the beam 8 is slidably connected. In the present instance, this connection is formed by means of a bearing sleeve 14 slidably mounted on the bar 13 and having pivot lugs 15 which are pivotally connected to corresponding lugs 16 carried by a bracket 17 rigidly secured to the forward end of the outer side member 9 of the said beam 8. The forward end of the beam as a whole is pivotally mounted on the vertically arranged member 7 of the yoke 6 to permit of the lateral adjustment of the beam as a whole. This connection is preferably formed by means of a bracket 18 rigidly secured to the transverse member 13 of the beam and having vertically arranged bearing sleeves 19 adapted to engage the vertical member 7 of the yoke and held against longitudinal movement on said vertically arranged member by means of a collar 20 secured to said vertically arranged member between the two parts of the bearing sleeve 19. Suitable means are provided for moving the sleeve 14, by means of which the outer side member 9 of the beam is supported, transversely of the machine on the horizontal member 13, thus causing the shovels carried by that member of the beam to be moved toward the shovels on the other member, thereby reducing the distance between the shovels. To this end a lever 21 is pivotally connected to the yoke 6, this connection being preferably formed by means of an arm 22 carried by the bearing sleeve 19, to the outer end of which the lever 21 is pivoted. This lever is preferably in the form of a bell crank lever and has one end thereof connected to the sleeve 14 of the movable member 9 of the beam, this connection being preferably formed by means of a link 23 pivotally connected at one end to the bell crank lever 21 and pivotally connected at its other end to said sleeve 14. The other arm of the lever 21 is connected by means of a rod 24 with a lever 25, which is pivotally mounted at 26 on the main frame and is provided with a suitable spring-pressed dog 27 adapted to engage the toothed rack 28 to hold the lever in its adjusted position. The handle of this lever extends rearwardly to a position within the reach of the driver, thereby enabling him, by the manipulation of this lever, to move the bearing sleeve 14 longitudinally of the transverse member 13 of the beam and thus adjust the cultivating members or shovels relatively one to the other without interrupting the forward movement of the machine.

The main frame 4 is, as stated, pivotally mounted upon the upwardly extending portion 3 of the axle and is adapted to be moved relatively to the axle and the ground wheels carried thereby to raise and lower the forward end of the shovel beam relatively to the ground, and, to this end, a transversely extending shaft 29 is journaled in bearings 30 on the opposite sides of said frame member and is provided near its outer ends with downwardly extending arms 31 which are connected by means of links 32 with the axle 2 at points near the ground wheels, this connection preferably being made by means of a lug 33 rigidly secured to said axle and pivotally connected to the end of said link. The shaft 29 is provided between the ends thereof with an upwardly extending arm 34 which is connected by means of a link or bar 35 with an operating lever 36 which is pivotally mounted on the main frame and preferably at a point near the upper portion of the upwardly extending member 3 of the axle. This lever 36 is provided with the usual spring-pressed dog 37 adapted to engage the toothed segment 38 to hold the lever in its adjusted position. The driver's seat 39 is supported from the frame 4, and, consequently, the weight of the driver, as well as the weight of the main frame and the cultivating members carried thereby, must be moved when the main frame is moved. Consequently, to raise the frame to its elevated position requires a very strong pull. In order to facilitate the upward movement of the main frame I have provided a spring 40 which is connected at one end to the shaft 29, preferably by means of a downwardly extending arm 41, which, in the present instance, forms a downward extension of the arm 34 to which the operating lever is connected. The opposite end of this spring is connected by the main frame, in the present instance by means of a downwardly extending lug 42 rigidly secured to the under side of the tongue 5, which, in turn, is rigidly secured to the main frame. The arrangement of this spring is such that the forward and downward movement of the main frame will be resisted by the spring, but, inasmuch as this movement is under the influence of the combined weight of the driver and of the frame, the tension of the spring will be overcome and the frame will be moved to the desired position without effort on the part of the driver. However, when it is desired to return the frame to its normal position, the tension of the spring comes into play and tends to draw the axle forwardly relatively to the main frame, thus elevating this frame to its uppermost position and greatly lessening the effort required on the part of the driver. Thus, it will be seen that I have provided a cultivator in which the gang beams surround the ground wheels and are pivotally supported from the main frame in such a manner as to permit their lateral adjustment and are so connected one to the other as to be adjustable relatively one to the other, thus permitting the distance between the cultivating members on the opposite sides of the wheel to be adjusted; that I have provided suitable mechanism whereby this adjustment may be accomplished by the driver from his position in the rear of the machine and without interrupting the forward movement of the machine; and further, that I have provided means for facilitating the adjustment of the main frame relatively to the axles to raise and lower the forward ends of the beams carrying the cultivating members to adjust the same relatively to the ground.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a cultivator, a main frame, a ground wheel, a beam comprising side members extending on opposite sides of said ground wheel and rigidly connected one to the other at one end of said beam, a transverse member carried by one of said side members near the forward end thereof, means for slidably connecting the other of said side members to said transverse member, means under the control of the driver for moving said last-mentioned side member longitudinally of said transversely extending member, and cultivating members carried by said side members.

2. In a cultivator, a main frame, a ground wheel, and a beam carried by said main frame and comprising side members extending on the opposite sides of said ground wheel and rigidly connected one to the other at their rear ends, a transverse bar rigidly secured to one of said members, a bearing sleeve carried by the other of said members and slidably mounted on said transverse bar, and means under the control of the driver for moving said bearing sleeve longitudinally of said transverse member.

3. In a cultivator, a main frame, a ground wheel, a beam carried by said main frame and comprising side members extending on opposite sides of said ground wheel and rigidly connected one to the other at their rear ends, a transverse bar rigidly secured to one of said members, a bearing sleeve carried by the other of said members and slidably mounted on said transverse bar, a vertical member carried by the main frame, means for pivotally connecting said transverse member to said vertical member, and means under the control of the driver for moving said bearing sleeve longitudinally of said transverse member.

4. In a cultivator, a main frame, a ground wheel, a gang beam supported from said main frame and comprising side members extending on the opposite sides of said ground wheel and connected one to the other in the rear thereof, cultivating members carried by said side members, a transverse bar secured to the forward end of one of said side members, and means for slidably connecting the other of said side members to said transverse bar, a bell crank lever supported from said main frame and connected at one end to the slidable connection between said last-mentioned side member and said transverse bar, and a lever connected to the opposite end of said bell crank lever and extending within reach of the driver.

5. In a cultivator, a main frame, a ground wheel, a beam comprising side members extending on opposite sides of said ground wheel and connected one to the other in the rear thereof, cultivating members carried by said side members, a transverse member rigidly secured to one of said side members and slidably connected to the other of said side members, a yoke carried by said main frame and having a vertically arranged member, a bearing sleeve mounted on said vertically arranged member and held against longitudinal movement relatively thereto, an arm carried by said bearing sleeve, a bell crank lever pivotally mounted on said arm and connected at one end to said last-mentioned side member and connected at its other end to an operating lever.

6. In a cultivator, a main frame, a ground wheel, a beam comprising side members extending on opposite sides of said ground wheel and connected one to the other in the rear thereof, cultivating members carried by said side members, a transverse member rigidly secured to one of said side members and slidably connected to the other of said side members, a yoke carried by said main frame and having a vertically arranged member, a bearing sleeve mounted on said vertically arranged member and held against longitudinal movement relatively thereto, means for securing said transverse member to said bearing sleeve, an arm carried by said bearing sleeve, and a bell crank lever pivotally mounted on said arm and connected at one end to said last-mentioned side member and connected at its other end to an operating lever.

7. In a cultivator, an axle having an upwardly extending portion, ground wheels carried by said axle, a main frame pivotally mounted on said upwardly extending portion of said axle, means for moving said main frame relatively to said axle, and a spring extending between said main frame and said axle and adapted to resist the movement of said main frame in one direction.

8. In a cultivator, an axle having an upwardly extending central portion, ground wheels mounted on said axle, a main frame pivotally connected to the upwardly extending portion of said axle, a shaft journaled on said main frame, an arm carried by said shaft, means for connecting said arm to said axle, and a spring extending between said shaft and said main frame and adapted to resist the rotation of said shaft in one direction, and means for rotating said shaft.

9. In a cultivator, an axle having an upwardly extending central portion, ground wheels carried by said axle, a main frame pivotally mounted on said upwardly extending portion of said axle, a shaft journaled on said main frame at a point forward of said axle, a downwardly extending arm carried by said shaft and connected to said axle, a second arm rigidly secured to said shaft between the ends thereof and extending above and below the same, a spring connected at one end to the lower end of said last-mentioned arm and connected at its other end to said main frame at a point forward of said shaft, and means connected to the upper end of said last-mentioned arm for rotating said shaft.

In testimony whereof, I affix my signature in presence of two witnesses.

GEORGE A. PLANK.

Witnesses:
H. N. MILLER,
E. I. HEDMAN.